May 14, 1929.  J. R. JUNKIN  1,713,133
MULTIPLE WHEEL DRIVE
Filed Nov. 1, 1927   2 Sheets-Sheet 2
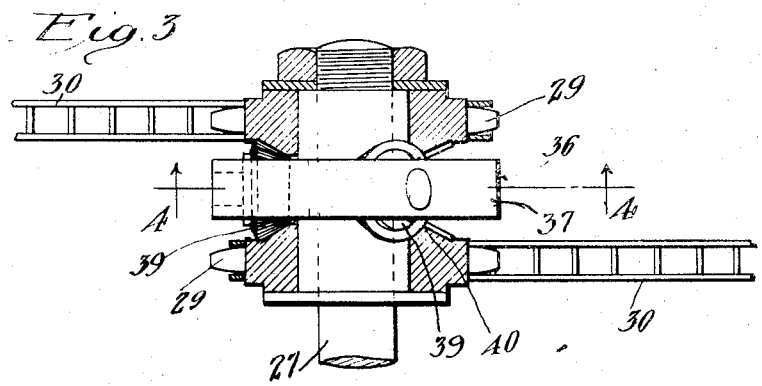
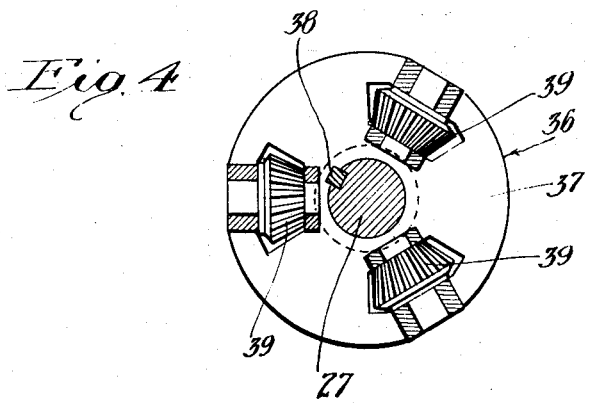
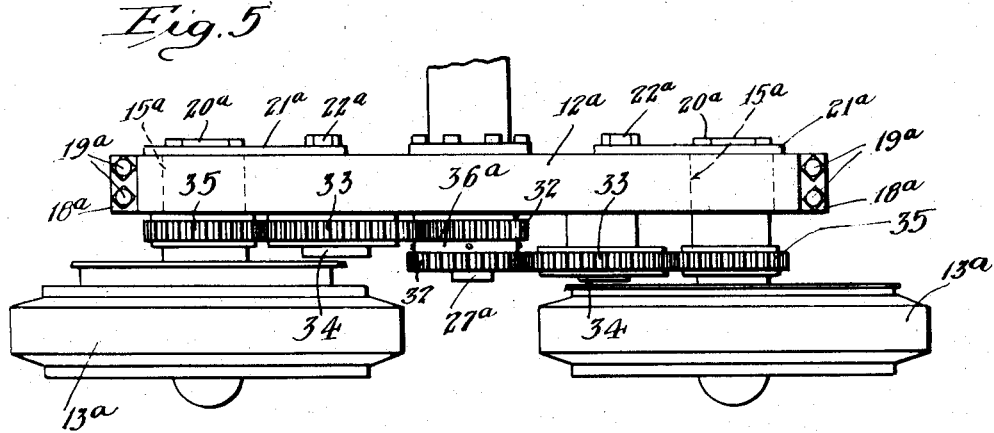
Inventor
John R. Junkin
By Lyon & Lyon
Attorneys Patented May 14, 1929.

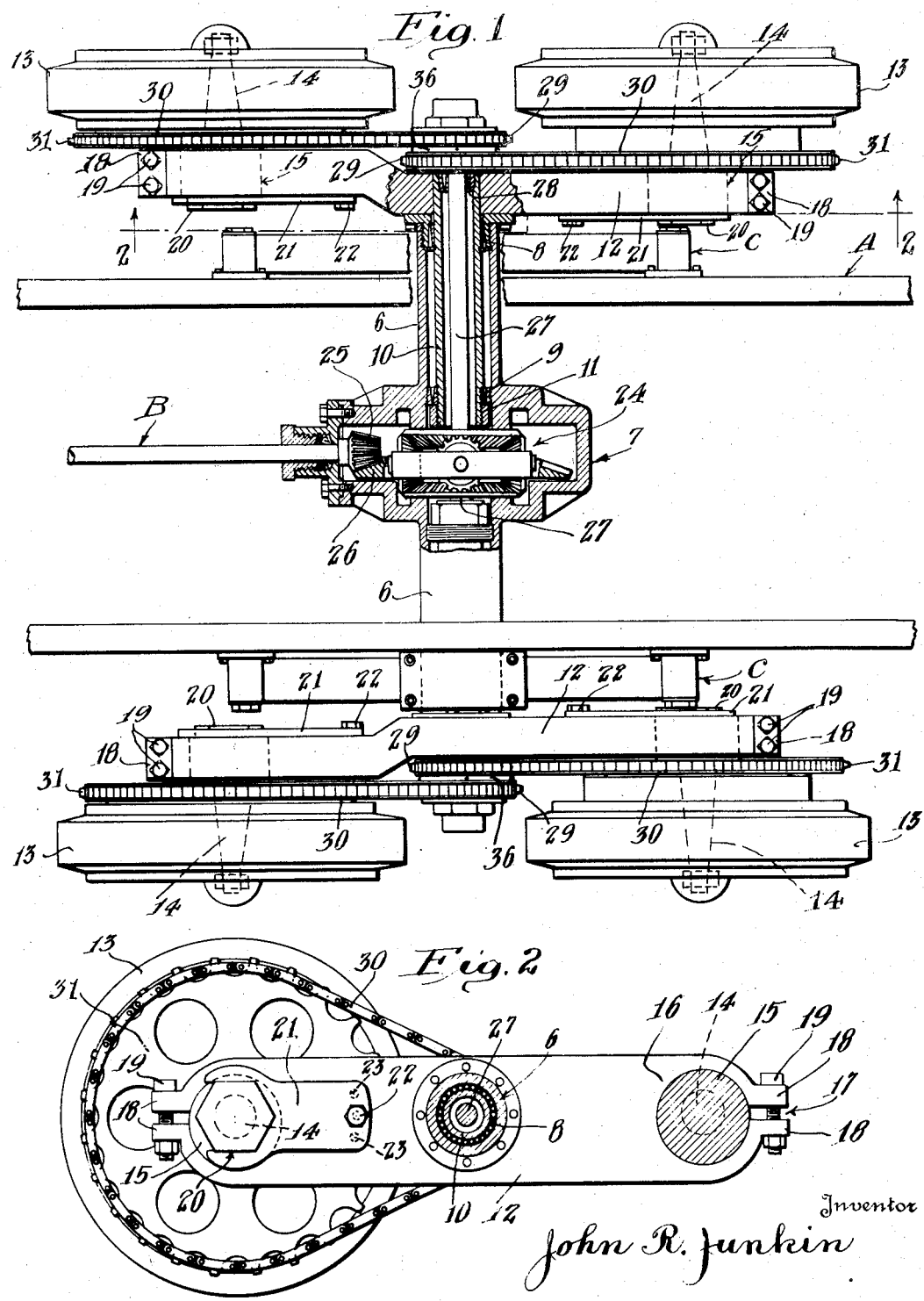

1,713,133

UNITED STATES PATENT OFFICE.

JOHN R. JUNKIN, OF SIERRA MADRE, CALIFORNIA.

MULTIPLE-WHEEL DRIVE.

Application filed November 1, 1927. Serial No. 230,250.

This invention relates to multiple wheel drives as commonly applied to motor vehicles in the form of four wheel drives, the main object of such four wheel drives being to decrease the load per unit of area on the roadway or, in other words, the distribution of the load over a greater surface.

An object of the present invention is to provide a construction that may be readily substituted for the two wheel drive with which many motor vehicles are at present equipped. When the invention is to be installed as an attachment to existing two wheel drive motor vehicles, the entire rear axle assembly is removed together with the wheels driven thereby and this invention is substituted therefor as it includes a rear axle and differential.

Another object of the invention is strength and simplicity of construction.

Another object is to provide an attachment of this character that will function the same as though the vehicle were originally equipped with the invention.

Another object is to provide in an economical way for a differential drive between each pair of wheels and the axle so that when the tires become worn to unequal diameters, differential motion can occur between those that are mounted on the wheels of one pair.

Other objects and advantages will appear in the subjoined detailed description.

The accompanying drawings illustrate the invention.

Fig. 1 is a plan view, partly in section, of a multiple wheel drive constructed in accordance with the provisions of this invention, a fragment of a chassis frame and a propeller shaft being indicated also in broken lines.

Fig. 2 is an elevation, partly in section, from the line indicated by 2—2 Fig. 1.

Fig. 3 is an enlarged sectional detail of one of the differential gearings.

Fig. 4 is an elevation, partly in section, from the line indicated by 4—4, Fig. 3.

Fig. 5 is a plan view showing a modification of the drive connections between the axle and the wheels.

A fragment of the motor vehicle frame is indicated at A and a fragment of the propeller shaft is indicated at B. The frame A is provided with the usual resilient suspension means indicated at C, said means in this instance being leaf springs and the necessary shackles. These parts may be of any well known or approved construction and need not be described more in detail herein. The suspension means C are attached to and support a housing comprising tubular end portions 6 and an enlarged intermediate differential gear case 7. The housing portions 6, 7 may be of integral construction or otherwise, as desired. Each tubular housing portion 6 is provided internally near its outer end with the bearing 8 and at its inner end with the bearing 9 and mounted in each set of bearings 8, 9 is a tubular member 10. The tubular members 10 are held against endwise movement outwardly by nuts 11 which are screwed onto the inner end portions of the tubular members 10 and thrust against the inner ends of the bearings 9. The tubular members 10 constitute the pivots of rocker arms 12 which are secured in any suitable manner to the members 10.

On the end portions of each rocker arm 12 are rotatably mounted drive wheels 13.

The wheels 13 are preferably mounted so that they can be adjusted toward and from one another for a purpose to be made clear hereinafter and, for this reason, the stub axles 14 of the wheels 13 are provided near their inner ends with eccentrics 15 which are mounted to turn in split bearings 16 on the end portions of the rocker arms 12. Each split bearing 16 is provided on opposite sides of its kerf 17 with ears 18 through which pass bolts 19 for the purpose of tightening the bearing upon the eccentric. By turning the eccentrics 15, it is clear that the associated stub axles will be moved toward or from one another, thus moving the associated wheels 13 closer together or farther apart.

In order to readily turn the eccentrics 15, the stub axles 14 are provided at their inner ends with wrench seats 20 which, in the present instance, are shown of hexagonal shape. To further secure the eccentrics 15 against turning in the bearings 16, it is preferable to permanently engage each of the wrench seats with a wrench 21. Each wrench 21 may be secured against turning by a cap screw or bolt 22 which selectively engages one of a number of holes 23 in the associated rocker arm 12. When it is desired to shift one of the wheels 13, the bolt 22 will be removed and the wrench 21 turned to cause turning of the eccentric 15. When such turning of the wrench 21 removes its outer end a distance from any of the holes 23, said wrench may be slipped off of the wrench seat and then returned to the wrench seat in a position to permit the bolt 22 to engage in one of the holes 23. Thus, the wrenches 21 serve the double purpose of turning the eccentrics and positively holding said eccentrics against turning after said eccentrics have been adjusted to the desired position.

Within the enlarged housing portion 7 is a differential gearing, indicated in general by the character 24. This differential gearing may be of the usual or any preferred type and is driven by the propeller shaft B through a pinion 25 on the propeller shaft and a ring gear 26 constituting a portion of the differential gearing 24.

The differential gearing 24 connects the two halves 27 of an axle. The axle halves 27 extend through the tubular members 10 and are rotatably supported near their outer ends in the tubular members 10 by bearings 28 which are carried by the tubular members 10. The axle halves 27 project beyond the outer faces of the rocker arms 12 and are connected by any suitable gearing with the wheels 13.

For illustrative purposes only, I have shown in the drawings several types of gearing for connecting the axle halves 27 with the wheels 13. For example, in Fig. 1 of the drawings the axle halves 27 are each provided with sprocket wheels 29 and the sprocket wheels 29 drive sprocket chains 30 which respectively engage other sprocket wheels 31 mounted on or connected with the drive wheels 13.

In Fig. 5 there is disclosed another type of gearing for connecting the shaft halves 27 with the wheels 13. In Fig. 5 the elements that functionally correspond to those illustrated in Fig. 1 are indicated by the same reference characters with the addition of the letter "a." In this instance, the axle half 27ª is provided with spur pinions 32 which drive idler spur gears 33, rotatably mounted at 34 on the rocker arm 12ª. The idler spur gears 33 are in mesh with spur gears 35 which are secured to or connected with the respective drive wheels 13ª. From this it will be seen that any suitable form of gearing may be employed for operatively connecting the axle with the drive wheels.

While it is possible to employ but the one differential gearing 24, it is preferable to employ other differential gearings, one such gearing between each pair of associated drive wheels 13 and, accordingly, instead of fixing the sprocket wheels 29 to the shaft halves 27, I prefer to rotatably mount said sprocket wheels 29 on the axle halves 27 and to connect the associated sprocket wheels 29, in each instance, by a differential gearing which is indicated in general by the character 36. This construction may be clearly seen in Figs. 3 and 4 where the spider 37 of the differential gearing is keyed or otherwise secured at 38 to the axle half 27 and said spider carries bevel pinions 39 in mesh with level gears 40 constructed integral with or secured in any suitable manner to the sprocket wheels 29.

The invention operates as follows:

The propeller shaft B, being driven by the prime mover in a manner well understood in this art, operates the axle halves 27 through the differential gearing 24; and the axle halves 27, through the differential gearings 36 and driving connections between said differential gearings 36 and wheels 13, effect driving of said wheels. In the construction illustrated in Fig. 1 the driving connections, as have been hereinbefore described, comprise the sprocket wheels 29, differential gearings 36, sprocket wheels 30 and sprocket wheels 31, and in Fig. 5 these connections comprise the gear wheels 32, 33, 35 and differential gearing 36ª. When the vehicle is steered to the right or left, the differential gearing 24 compensates for the differences in the distance traveled by the pairs of wheels on opposite sides of the vehicle, in a manner well understood in this art. The differential gearing 24 also compensates for different speeds of the pairs of wheels on opposite sides of the vehicle due to any difference in diameters of the tires of the wheels.

Each of the differential gearings 36 compensates for differences in rim travel of the associated wheels 13 resulting from a difference in diameters of the tires of said wheels or from any inequalities in the surface of the roadway upon which said tires are running.

I claim:

1. A multiple wheel drive comprising a housing, a differential gearing in the housing, rocker arms provided with tubular members oscillatably mounted in said housing, axle members connected at their inner ends with the differential gearing and rotatably mounted in the tubular members and projecting beyond the rocker arms, power transmitting members associated with each axle member, and a differential gearing operably connecting each axle member with the power transmitting member associated therewith.

2. A multiple wheel drive comprising a housing, a differential gearing in the housing, rocker arms provided with tubular members oscillatably mounted in said housing, axle members connected at their inner ends with the differential gearing and rotatably mounted in the tubular members and projecting beyond the rocker arms, wheels rotatably mounted on each of the rocker arms, and driving connections connecting each axle member to the wheels associated with one of the rocker arms, each of said driving connections including a differential gearing.

3. A multiple wheel drive comprising a housing, a differential gearing in the housing, rocker arms provided with tubular members oscillatably mounted in said housing, axle members rotatably mounted in the tubular members and connected at their inner ends with the differential gearing and projecting through the rocker arms, a spider secured to the outer end of each axle member, a pair of gears rotatably mounted on each axle member, pinions carried by each spider and meshing with the associated pair of gears, a vehicle frame, a means supporting the frame on the tubular members, wheels rotatably mounted on the opposite ends of each rocker arm, and driving connections between the respective wheels and gears whereby to compensate for differences in peripheral speeds of the wheels associated with either rocker arm.

Signed at Los Angeles, Calif., this 17 day of October, 1927.

JOHN R. JUNKIN.